United States Patent
Buehl et al.

(10) Patent No.: US 7,934,761 B2
(45) Date of Patent: May 3, 2011

(54) STORAGE COMPARTMENT WITH A SUPPORTING FRAME, AND RECEIVING DEVICE FOR A SUPPORTING FRAME

(75) Inventors: Olaf Buehl, Albershausen (DE); Christoph Gallandt, Nuertingen (DE); Uwe Rau, Besigheim (DE); Werner P. Schlecht, Vaihingen/Enz (DE)

(73) Assignee: BOS GmbH & Co. KG, Ostfildern (DE)

( * ) Notice: Subject to any disclaimer, the term of this patent is extended or adjusted under 35 U.S.C. 154(b) by 0 days.

(21) Appl. No.: 12/315,111

(22) Filed: Nov. 26, 2008

(65) Prior Publication Data

US 2009/0134653 A1 May 28, 2009

(30) Foreign Application Priority Data

Nov. 26, 2007 (DE) .......................... 10 2007 058 255

(51) Int. Cl.
*B60R 9/00* (2006.01)
(52) U.S. Cl. ..................... 296/37.16; 296/37.1; 296/37.8
(58) Field of Classification Search ............... 296/37.16, 296/37.1, 37.8
See application file for complete search history.

(56) References Cited

U.S. PATENT DOCUMENTS

| | | | |
|---|---|---|---|
| 3,310,089 A | 3/1967 | Silverman | |
| 4,502,674 A | 3/1985 | White et al. | |
| 5,152,440 A | 10/1992 | Chao | |
| 5,207,260 A | 5/1993 | Commesso | |
| 5,971,433 A | 10/1999 | Ament et al. | |
| 6,390,526 B1 | 5/2002 | Ament et al. | |
| 6,439,633 B2 | 8/2002 | Nemoto | |
| 6,598,921 B2 | 7/2003 | Seel et al. | |
| 6,715,525 B2 | 4/2004 | Ehrenberger et al. | |
| 7,028,872 B2 | 4/2006 | Lobanoff | |
| 7,048,319 B2 | 5/2006 | Ament et al. | |
| 7,121,601 B2 | 10/2006 | Mulvihill et al. | |
| 7,255,382 B2 | 8/2007 | Ament et al. | |
| 7,318,617 B1 | 1/2008 | Scotton | |
| 7,537,257 B2 | 5/2009 | Watanabe et al. | |
| 7,762,602 B2 | 7/2010 | Bohlke et al. | |
| 2002/0000734 A1* | 1/2002 | Bharj et al. ................ | 296/37.16 |
| 2007/0164581 A1 | 7/2007 | Ehrenberger | |
| 2009/0045645 A1 | 2/2009 | Bohlke et al. | |
| 2009/0167043 A1 | 7/2009 | Aebker | |

FOREIGN PATENT DOCUMENTS

DE 198 58 194 A1 6/2000
(Continued)

OTHER PUBLICATIONS

European Patent Office Search Report dated Apr. 6, 2009 (4 pages).

*Primary Examiner* — Joseph D Pape
(74) *Attorney, Agent, or Firm* — Flynn, Thiel, Boutell & Tanis, P.C.

(57) ABSTRACT

A storage compartment for a motor vehicle is provided. The storage compartment includes a wall and a supporting frame for supporting the wall. The wall can be varied in height, at least in some sections, by at least one winding shaft. The supporting frame has at least one receiving device with at least one connecting piece. The winding shaft is mounted on the connecting piece such that the winding shaft forms part of the supporting frame.

19 Claims, 3 Drawing Sheets

FOREIGN PATENT DOCUMENTS

| | | |
|---|---|---|
| DE | 101 17 837 A1 | 1/2002 |
| DE | 103 32 983 A1 | 2/2005 |
| DE | 103 48 890 A1 | 5/2005 |
| DE | 10 2005 051 732 A1 | 5/2007 |
| DE | 10 2006 006 665 A1 | 8/2007 |
| DE | 10 2006 013 973 A1 | 9/2007 |
| DE | 10 2006 013 974 A1 | 9/2007 |
| EP | 0 914 989 A2 | 5/1999 |
| EP | 1 332 919 A2 | 8/2003 |
| EP | 1 717 104 A1 | 11/2006 |
| FR | 2 743 035 | 7/1997 |
| FR | 2 876 641 | 4/2006 |
| JP | 60-222339 | 11/1985 |
| WO | WO 2007/104563 A1 | 9/2007 |

* cited by examiner

STORAGE COMPARTMENT WITH A SUPPORTING FRAME, AND RECEIVING DEVICE FOR A SUPPORTING FRAME

FIELD OF THE INVENTION

The invention relates to a storage compartment, with a wall and a supporting frame supporting the wall, wherein the wall can be varied in height, at least in some sections, by means of at least one first winding shaft.

BACKGROUND OF THE INVENTION

DE 10 2006 013 974 A1 discloses storage compartments which are usable temporarily, wherein the storage compartments have a deformable side wall such that the storage compartments can be varied in height. The storage compartment can be adjusted in height and therefore also in size by means of the deformable side wall as a function of a desired use. As a result, it is possible for the storage compartment to have a minimal height when not in use such that a storage compartment arranged, for example, in a loading compartment below a rear parcel shelf projects only negligibly into the loading compartment. By contrast, the storage compartment can be enlarged to a desired size for use. In this case, one wall can be formed, at least in some sections, by a roller-blind web which is fitted in a manner such that it can be wound up and unwound on a winding shaft. The winding shaft is mounted in a supporting frame.

SUMMARY OF THE INVENTION

It is the object of the present invention to provide a storage compartment which is usable temporarily and which weighs as little as possible. It is a further object of the invention to provide a receiving device for storing a winding shaft of a storage compartment.

This object is achieved by a storage compartment, with a wall and a supporting frame supporting the wall, wherein the wall can be varied in height, at least in some sections, by means of at least one first winding shaft, the supporting frame has at least one receiving device with at least one first connecting piece, and the first winding shaft is mounted on the first connecting piece such that the first winding shaft forms part of the supporting frame.

In order to vary the height, the wall can be deformable flexibly and/or inflexibly. In this case, the height is varied by means of the at least one winding shaft. In one configuration, the wall is foldable in the manner of a venetian blind or in the manner of a concertina, with there being straps which can be wound up on the winding shaft such that the wall is folded or pushed together. In another configuration, at least part of the wall is designed as a flexible sheetlike structure, with the sheetlike structure being fitted in a manner such that it can be wound up and unwound in the form of a roller-blind web on the winding shaft.

The winding shaft is mounted rotatably by means of the receiving device with the connecting piece, the winding shaft and the receiving device forming part of the supporting frame. This makes it possible to dispense with additional elements for the mounting of the winding shaft. Consequently, a particularly lightweight construction of the storage compartment is possible. In an advantageous configuration, the winding shaft is designed, at least at the ends, as a tube or bushing such that it can be placed onto the connecting piece.

In one configuration, the supporting frame spans a substantially rectangular surface, with the receiving device forming a corner region of the supporting frame. A rectangular configuration of the supporting frame and therefore also of the storage compartment is advantageous, for example, when the storage compartment is fitted in a displaceable manner in a motor vehicle.

In one development, the receiving device has at least two substantially structurally identical connecting pieces arranged substantially at right angles to one another, preferably at least three of the same arranged in a T-shaped manner. By means of two connecting pieces arranged at right angles to each other, two correspondingly arranged winding shafts can be mounted via a common receiving device. In a configuration with three connecting pieces, a remaining connecting piece can be used for the connection of further functional elements. The structurally identical configuration of the connecting pieces makes it possible to arrange an element in different positions.

In an advantageous configuration, the connecting pieces have an outer contour, which is not rotationally symmetrical, for the rotationally fixed receiving of a bearing sleeve. In this case, the receiving device can be manufactured from a material enabling advantageous production. The material here is to have a sufficient degree of rigidity in order to absorb forces which occur. In other configurations, stiffening of at least some sections of the receiving device is provided for this. In order to realize good sliding bearing properties for the rotary bearings of the winding shaft, bearing sleeves are preferably fitted on the connecting pieces. The bearing sleeves can be produced with low manufacturing tolerances from a suitable material.

In one configuration of the invention, a blocking device is at least partially arranged on a connecting piece, and the blocking device is able to block at least one rotational movement of the first winding shaft. Further bearing elements can be dispensed with by the blocking device or parts thereof being mounted on the receiving device. As a result, it is also possible to arrange corresponding elements in any corner region of the supporting frame.

In one development, the blocking device comprises a catch, with a rotational movement of the winding shaft in order to reduce the height of the wall being able to be blocked by the catch. A corresponding blocking device can be realized in a simple manner. In order "to retract" the wall or the storage compartment, a known spring motor, for example, is provided on the winding shaft, with the wall being unwound or lengthened counter to the force of the spring motor. In order to prevent a retraction, the catch engages in a corresponding mating element, for example a toothed wheel with asymmetric tooth flanks.

In another configuration, the blocking device has means which are able to block a rotational movement of the winding shaft for lengthening the wall. It has turned out that, for example due to vibrations or the like during transportation in the motor vehicle, the storage compartment can be subjected to forces leading to an undesirable lengthening of the wall. Such lengthenings can be avoided by means of a suitable blocking device.

The receiving device preferably has at least one bearing connecting piece for the connection of a guide device, in particular a running rail. In this case, the bearing connecting piece can be configured substantially structurally identically to the further connecting pieces of the receiving device. However, in other configurations, different constructional forms are provided on account of different demands made of the bearing connecting piece. In particular for receiving the winding shafts, the connecting pieces preferably have a minimum length such that they project sufficiently into the winding shaft. By contrast, the bearing connecting piece can be configured to be comparatively short. In one exemplary embodiment, the three connecting pieces, which are provided in a T-shaped manner, and the bearing connecting piece are arranged in one plane. An intersecting region of the connecting pieces and of the bearing connecting piece can serve here as a connecting region for a covering or panel and/or for the fitting of further functional elements.

In a further configuration, a bevel gear is arranged in a rotationally fixed manner at least one end of the winding shaft, the bevel gear interacting with a blocking bevel gear of the blocking device. In this case, the bevel gear and the blocking bevel gear are mounted at an angle predetermined by the receiving device such that reliable alignment is possible.

In one configuration, the wall comprises at least two roller-blind webs which are fitted in a manner such that they can be wound up and unwound on two winding shafts arranged substantially at right angles to each other. As a result, a particularly streamlined configuration of the storage compartment is possible. The receiving device according to the invention enables the two winding shafts to form parts of the supporting frame. In addition, a blocking device can be positioned exactly in the corner region provided in this way.

The edges of the roller-blind webs preferably have mutually complementary zip-fastener elements which can be connected by a zip-fastener slider mounted in a substantially positionally fixed manner. This enables the creation of a closed storage compartment by which even small items, such as mobile telephones, mp3 players, CD players, books, files, etc. can be securely accommodated.

In an advantageous development of the receiving device, the zip-fastener slider is mounted in the receiving device. As a result, the zip-fastener slider can likewise be fitted in an exact position relative to the roller-blind webs which are to be connected. A bearing for the zip-fastener slider is formed, for example, in an intersecting region of the connecting pieces.

The object is further achieved by a receiving device for at least one winding shaft of a storage compartment, with a wall, wherein the wall can be varied in height, at least in some sections, by the winding shaft, the receiving device has a first connecting piece on which the winding shaft is rotatably mounted, and at least one second connecting piece, and a second winding shaft, a blocking device and/or a guide device can be mounted on the second connecting piece. It is possible, by means of a corresponding receiving device, to form at least some sections of a supporting frame by the winding shaft.

BRIEF DESCRIPTION OF THE DRAWINGS

Further advantages of the invention emerge from the description below of exemplary embodiments of the invention, which are illustrated schematically in the drawings. Uniform reference numbers are used in the drawings for identical or similar components. Features described or illustrated as part of an exemplary embodiment can likewise be used in a different exemplary embodiment in order to obtain a further embodiment of the invention.

In the schematic drawings.

DETAILED DESCRIPTION

Figure 1:
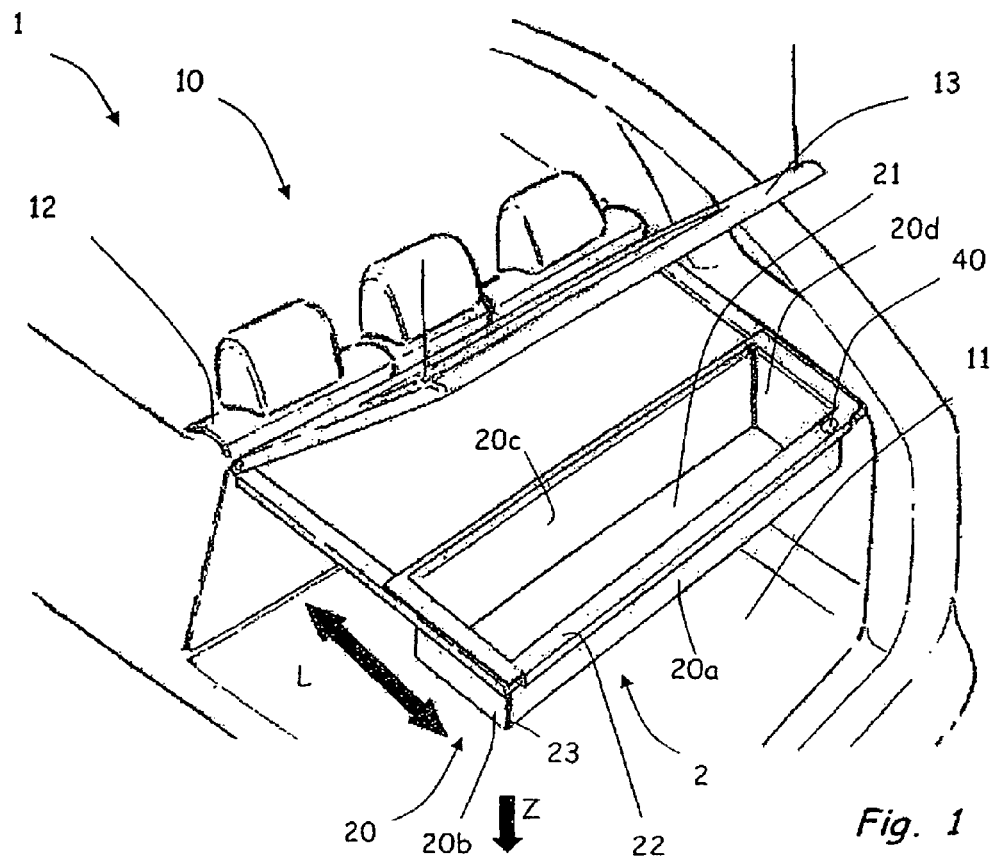
FIG. 1 shows an illustration of a vehicle rear with a storage compartment according to the invention.

FIG. 1 shows, schematically, a vehicle rear 1 of a motor vehicle (not illustrated further). The motor vehicle illustrated is an estate vehicle, with a passenger compartment 10 and a loading compartment 11 being separated from each other via a rear bench 12. The loading compartment 11 can be covered by a tailgate 13 which is fitted pivotably level with the rear bench 12. A storage compartment 2 according to the invention is arranged below the tailgate 13. The storage compartment 2 illustrated is mounted displaceably in a longitudinal direction L via guide rails (not illustrated in FIG. 1) or the like. The storage compartment 2 has a wall 20 and a base 21, with it being possible for the wall 20 to be increased in height in a direction Z. In the exemplary embodiment illustrated, the wall 20 illustrated comprises four flexible sheetlike structures or roller-blind webs 20a to 20d which are each fitted in a manner such that they can be wound up and unwound on a winding shaft which is concealed in FIG. 1 by a covering 22. The flexible sheetlike structures or roller-blind webs 20a to 20d are, for example, a knitted fabric, woven fabric, non-woven fabric, a film web or similar, or combinations thereof. The four winding shafts are arranged in such a manner that they surround a rectangular base surface 21. In order to provide a closed storage space during the unwinding of the roller-blind webs 20a to 20d, mutually adjacent roller-blind webs 20a to 20d can each be connected to each other by a zip fastener 23 in the Z direction during the unwinding of the roller-blind webs 20a to 20d.

The roller-blind webs 20a to 20d are unwound by the winding shafts, which are concealed in FIG. 1, and therefore the height of the storage compartment 2 is enlarged in the Z direction, for example, by a force being applied to the storage compartment base 21. An appropriate force can take place, for example, by insertion of an object (not illustrated in FIG. 1) and/or by application of a compressive force by a user. In this case, the wall 20 is lengthened preferably counter to the force of a constraining element, for example a spring (not illustrated here). In this case, spring elements in the form of spring motors or the like can be provided on each winding shaft 24a to 24d. In the exemplary embodiment illustrated, a retraction of the storage compartment 2, i.e. a reduction in the height counter to the Z direction, is blocked by a blocking device (not illustrated specifically in FIG. 1). The blocking device can be released by a release knob 40 and therefore the storage compartment 2 can be retracted.

Figure 2:
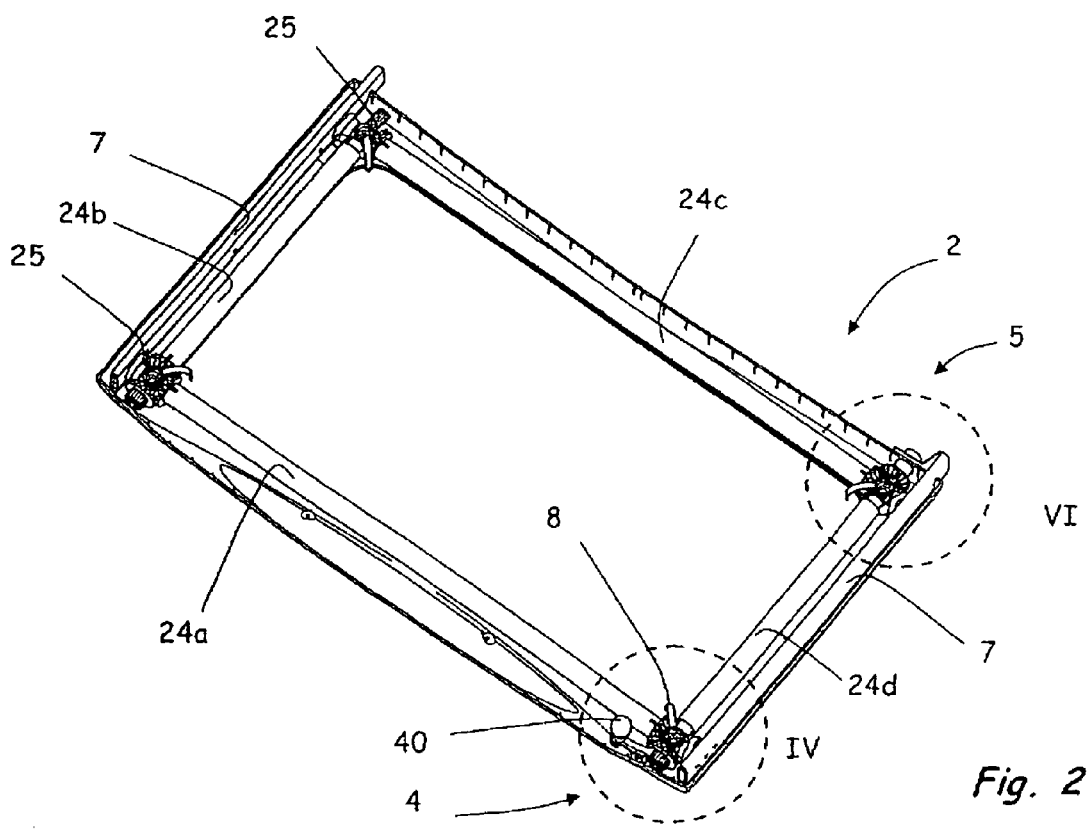
FIG. 2 shows a top view of a storage compartment according to FIG. 1.

FIG. 2 shows, schematically, a top view of the storage compartment 2 according to FIG. 1 without a covering 22. As a result, the winding shafts 24a to 24d of the storage compartment 2 are visible in FIG. 2. The winding shafts 24a to 24d are each connected to one another at right angles by means of receiving devices 3 (illustrated in detail in FIG. 3) such that the receiving devices 3 and the winding shafts 24a to 24d form a supporting frame for the storage compartment 2. The winding shafts 24a to 24d preferably have bevel gears 25 at both ends, with the bevel gears 25 only partially being illustrated in the figures for the purpose of better clarity. A blocking device 4 for preventing a winding-up movement is provided in a first corner region of the storage compartment 2. A blocking device 5 which is able to prevent a lengthening of the wall 20 visible in FIG. 1 is provided in a further corner region. Furthermore, a holder 8 for a zip-fastener slider (not illustrated) of the zip fasteners 23 (illustrated in FIG. 1) is provided in each of the four corner regions. Guide rails 7 are fitted on the storage compartment 2 for a displaceable mounting of the same.

Figure 3:
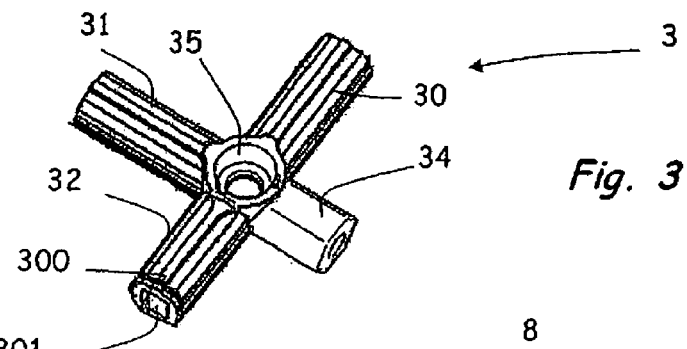
FIG. 3 shows a receiving device according to the invention.

FIG. 3 shows, schematically, a receiving device 3. In the exemplary embodiment illustrated, the receiving device 3 comprises, as can be seen in FIG. 3, three substantially structurally identical connecting pieces 30 to 32 which are arranged in a substantially T-shaped manner with respect to one another. In other words, the connecting pieces 30 to 32 lie in one plane, and a middle connecting piece 31 in each case encloses a right angle with the two other connecting pieces 30, 32. The connecting pieces 30 to 32 each have an outer contour, which is not rotationally symmetrical, and therefore various components, as described in detail furtherbelow, can be fitted on the connecting pieces 30 to 32 in a rotationally fixed manner. In the exemplary embodiment illustrated, for this purpose the surfaces of the connecting pieces 30 to 32 each have spring projections 300 which can be introduced into corresponding grooves in the components to be received. In the exemplary embodiment illustrated, a cavity 301 is furthermore formed in the connecting pieces 30 to 32, by means of which cavity further elements can be connected to the connecting pieces 30 to 32. The receiving device furthermore has a bearing connecting piece 34 for the connection of a guide device, for example a guide rail 7 which can be seen in FIG. 2. A bearing 35 for a holder 8 (likewise illustrated in FIG. 2) for a zip-fastener slider is provided in an intersecting region of the connecting pieces 30 to 34.

Figure 4:
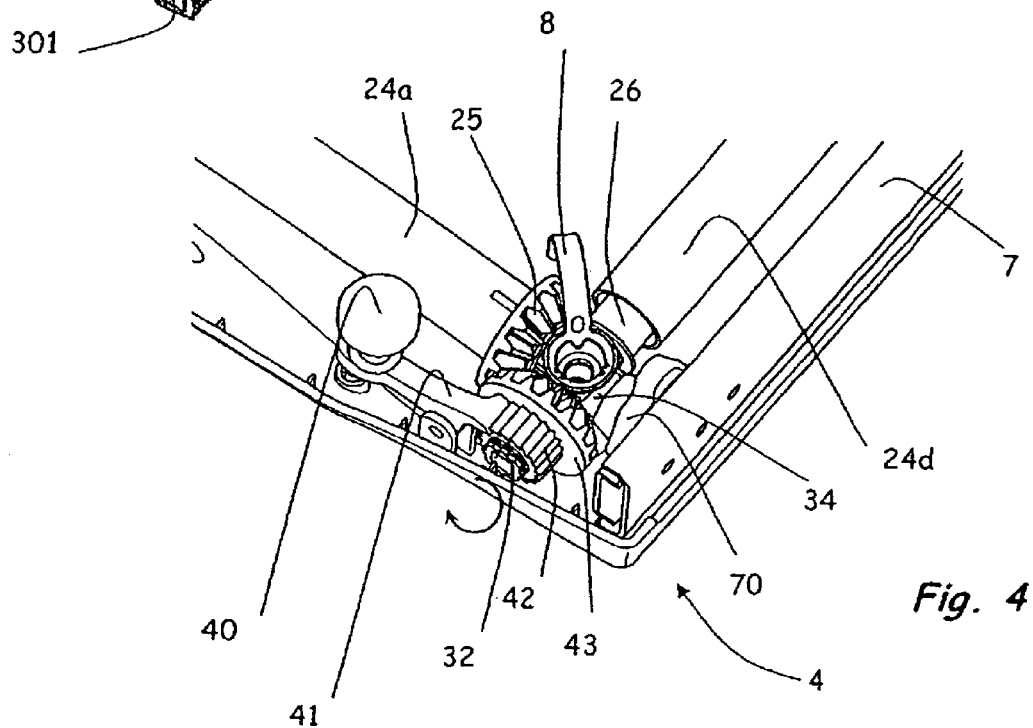
FIG. 4 shows a detail IV according to FIG. 2.

FIG. 4 shows, schematically, a detail IV according to FIG. 2, with the blocking device 4 being illustrated in detail. The blocking device 4 comprises a catch 41 which engages in a toothed wheel 42 having asymmetrical tooth flanks. In the exemplary embodiment illustrated, the catch 41 blocks a rotation of the toothed wheel 42 in the anti-clockwise direction. By contrast, a rotation in the clockwise direction, as illustrated schematically by an arrow, is only insignificantly obstructed, if at all, by the catch 41. A release knob 40 is provided in order to release the catch 41. The toothed wheel 42 is connected in a rotationally fixed manner to a blocking bevel gear 43. The blocking bevel gear 43 meshes with a bevel gear 25 of the winding shaft 24a. As a result, by blocking of the rotational movement of the toothed wheel 42, a rotational movement of the winding shaft 24a in one direction can also be blocked by the catch 41. In this case, the arrangement is selected such that a rotational movement of the winding shaft 24a, by means of which a roller-blind web (not illustrated in FIG. 4) is wound up onto the winding shaft 24a, in a first direction is blocked by the catch 41. A further bevel gear is preferably connected to the bevel gear 25 of the winding shaft 24a, the further bevel gear not being illustrated in FIG. 4. As a result, a bearing sleeve 26 can be seen in FIG. 4, which bearing sleeve is fitted on the connecting piece 30 according to FIG. 3 and on which the bevel gear and the winding shaft 24d are mounted.

As can furthermore be seen in FIG. 4, a bearing element 70, by means of which the receiving device 3 is connected to the guide rail 70, is fitted on the bearing connecting piece 34, which is largely concealed in FIG. 4.

Figure 5:
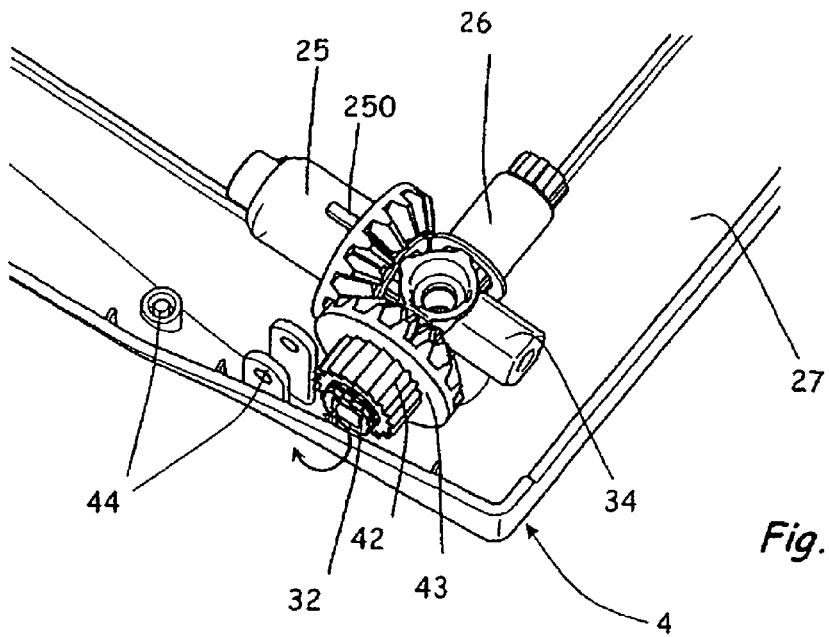
FIG. 5 shows the detail according to FIG. 4 in a partially disassembled state.

FIG. 5 shows the detail according to FIG. 4, with an illustration of the guide rail 7, the winding shafts 24a and 24d, the catch 41 and the release knob 40 being omitted. As can be seen in FIG. 5, the bearing elements 44 for the release knob 40 and the catch 41 according to FIG. 4 are provided on a panel 27. However, according to the invention, the panel 27 does not have any supporting function, or at least no substantial supporting function, since the supporting function of the storage compartment 2 is fulfilled, according to FIG. 1, by means of the supporting frame which is formed by the winding shafts 24a to 24d and the receiving devices 3. The panel 27 can therefore be produced, for example, from a material having a relatively low specific weight. The panel 27 is to have a certain degree of rigidity just for a weight applied during the actuation of the release knob 40 and/or of the catch 41. For this purpose, for example, some regions of the panel 27 can be reinforced. By contrast, weights caused by objects placed into the storage compartment do not have to be absorbed by the panel 27 and/or a covering 22 illustrated in FIG. 1. As can furthermore be seen in FIG. 5, the bevel gears 25 illustrated have latching projections 250 by means of which the bevel gears 25 can be coupled in a rotationally fixed manner to associated winding shafts 24a to 24d.

By means of the three substantially structurally identical connecting pieces 30 to 32, it is possible to provide the blocking device 4 on the storage compartment 2 in a total of eight different positions. The designer of a storage compartment for a certain type of vehicle is therefore provided with great freedom of design. In addition, it is conceivable also to mount different blocking devices on the receiving device, the blocking devices making it possible to prevent a rotational movement of the winding shafts 24a to 24d in a winding-up direction of the rollerblind webs 20a to 20d. It is thus conceivable, for example, to configure the blocking device as a loop brake or the like. Furthermore, it is possible, by means of a receiving device according to the invention, also to mount a blocking device which prevents the wall 20 from lengthening in a Z direction according to FIG. 1, for example during transportation.

Figure 6:
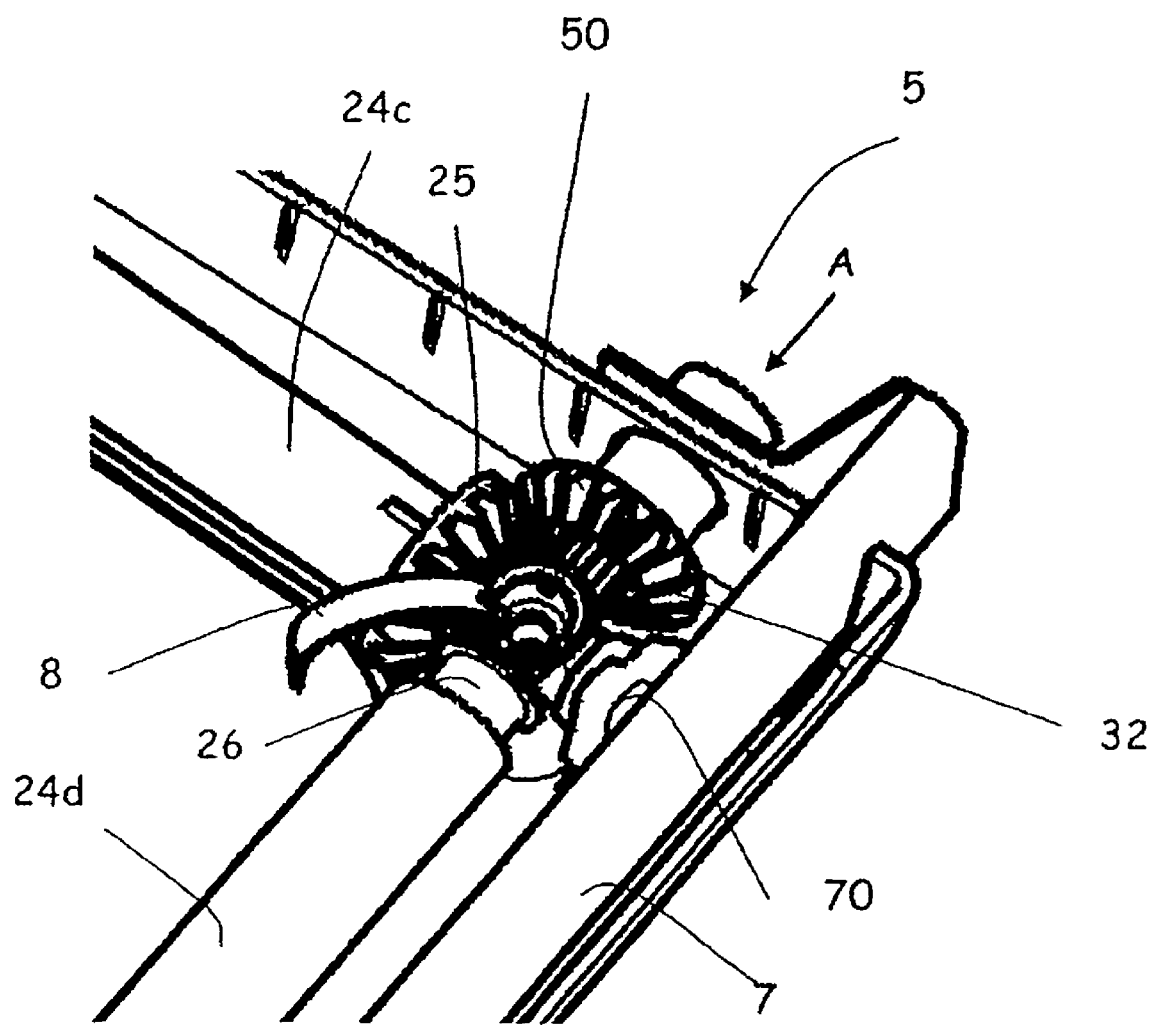
FIG. 6 shows a detail VI according to FIG. 2.

FIG. 6 shows, schematically, a detail VI according to FIG. 2 with a blocking device 5 which prevents the wall 20 from lengthening in the Z direction according to FIG. 1. The blocking device 5 comprises a blocking bevel gear 50 which is fitted on a connecting piece 32 of a receiving device 3 according to FIG. 3. In this case, the blocking bevel gear 50 is arranged in such a manner that, without blocking forces acting from the outside, it does not mesh with a bevel gear 25 of a winding shaft 24c, which bevel gear is arranged on a connecting piece 31 which is concealed in FIG. 6 and is at right angles to the connecting piece 32. The blocking bevel gear 50 is kept in a position not in engagement with the bevel gear 25, for example by means of a spring (not illustrated) or another constraining element. The blocking bevel gear 50 can be displaced along the connecting piece 32 in an axial direction A such that it comes into engagement with the bevel gear 25 and thus prevents a rotation of the winding shaft 24c which is connected in a rotationally fixed manner to the bevel gear 25. For this purpose, the blocking bevel gear 50 is connected, for example in a rotationally fixed manner, to a bevel gear (not illustrated in FIG. 6) which is arranged on the sleeve 26 (illustrated in FIG. 6), wherein the sleeve 26 is mounted on the connecting piece 30 of the receiving device 3, which connecting piece 30 is arranged coaxially with respect to the connecting piece 32. If the two coaxially arranged, mutually facing bevel gears which are connected to each other in a rotationally fixed manner engage at the same time in the bevel gear 25 located inbetween, they drive the bevel gear 25 in the opposite direction or are driven in the opposite direction by the bevel gear 25. A rotational movement of the winding shafts 24c and 24d and of the remaining winding shafts 24a, 24b which are synchronized therewith can therefore be effectively prevented.

In another configuration, the blocking bevel gear 50 is mounted in a rotationally fixed manner on the receiving device 3 such that, when the blocking bevel gear 50 and the bevel gear 25 arranged on the winding shaft 24c engage in each other, a rotational movement is effectively prevented.

The receiving device 3 according to the invention can therefore receive the winding shafts 24a to 24d and also any functional elements, such as the blocking devices 4, 5 or the holder 8. The universal use of the receiving device 3 enables tooling costs to be reduced. The receiving device 3 and the winding shafts 24a to 24d take on the supporting function of the storage compartment, and coverings 22 or panels 27 which are possibly additionally provided merely have a function of protecting against prying eyes. As a result, the weight of the storage compartment can be reduced in comparison to constructions with bearing supporting frames. In addition, the individual components can be positioned very precisely with respect to one another.

The invention claimed is:

1. A storage compartment for a motor vehicle comprising a wall, a supporting frame supporting said wall, and a winding shaft which allows variation in height of a section of said wall, said supporting frame including a receiving device with a connecting piece, said winding shaft being mounted on said connecting piece such that said winding shaft forms part of said supporting frame, said storage compartment further comprising a blocking device at least partially arranged on said connecting piece, said blocking device being able to block a rotational movement of said winding shaft.

2. The storage compartment of claim 1, wherein said blocking device is disposed to block a rotational movement of said winding shaft which would cause one of: a reduction in the height of said wall; and an increase in the height of said wall.

3. A storage compartment for a motor vehicle comprising:
   a winding shaft;
   a wall arrangement having a wall section supported on said winding shaft and variable in height by operation of said winding shaft; and
   a supporting frame disposed to support said wall arrangement and including a receiving device, said receiving device including a first connecting piece and a second connecting piece arranged at a substantially right angle relative to said first connecting piece and in substantially the same plane as said first connecting piece,
   wherein said winding shaft is mounted on said first connecting piece such that said winding shaft forms part of said supporting frame, and said winding shaft is rotatably mounted on said first connecting piece and is rotatable relative to said first connecting piece and said receiving device to vary the height of said wall section.

4. The storage compartment of claim 3, wherein said winding shaft is a first winding shaft, said wall section is a first wall section and said wall arrangement includes a second wall section, said storage compartment comprises a second winding shaft rotatably mounted on said second connecting piece and being rotatable relative to said second connecting piece and said receiving device, said second wall section being supported on said second winding shaft and being variable in height by operation of said second winding shaft.

5. The storage compartment of claim 4, wherein said first and second wall sections each comprise a roller-blind web configured for being wound up on the respective said first and second winding shafts and for being unwound from the respective said first and second winding shafts, each said roller-blind web defining a longitudinal axis, wherein the longitudinal axes of the respective said roller-blind webs are disposed at a substantially right angle relative to one another.

6. The storage compartment of claim 5, wherein said roller-blind webs have respective adjacent edges with cooperating zip-fastener elements connected to one another by a zip-fastener slider mounted on said storage compartment in a substantially fixed manner.

7. The storage compartment of claim 6, wherein said zip-fastener slider is mounted in said receiving device at an area where said first and second connecting pieces intersect one another.

8. The storage compartment of claim 3, wherein said first connecting piece and said second connecting piece are substantially structurally identical to one another.

9. The storage compartment of claim 8, wherein said receiving device has a third connecting piece substantially structurally identical to said first connecting piece and said second connecting piece, said third connecting piece being arranged at a substantially right angle relative to said first connecting piece and in substantially the same plane as said first connecting piece and said second connecting piece such that said first connecting piece, said second connecting piece and said third connecting piece are arranged in and together form a T-shaped configuration and are substantially coplanar with one another.

10. The storage compartment of claim 9, wherein said receiving device has a bearing connecting piece coaxially aligned with said first connecting piece and oriented at a substantially right angle relative to said second connecting piece and said third connecting piece, said supporting frame including an elongate rail disposed and configured to permit displaceable mounting of said storage compartment in a motor vehicle, said bearing connecting piece being connected to said rail and being coplanar with said first connecting piece, said second connecting piece and said third connecting piece.

11. The storage compartment of claim 4, wherein each said first and second connecting piece defines an outer contour which is non-rotationally symmetrical, said storage compartment comprising a bearing sleeve mounted on each of said first and second connecting pieces such that said bearing sleeves are non-rotatable relative to the respective said first and second connecting pieces, an end of each said first and second winding shaft being mounted on a said bearing sleeve so as to be rotatable relative to said bearing sleeve.

12. The storage compartment of claim 3, wherein said supporting frame is substantially rectangular in configuration, said receiving device being disposed at and defining a corner region of said supporting frame.

13. The storage compartment of claim 3, wherein said winding shaft is a first winding shaft, and one of: a second winding shaft; a blocking device for blocking rotational movement of said first winding shaft; and a guide device for movably supporting said storage compartment in a motor vehicle is mounted on said second connecting piece.

14. A storage compartment for a motor vehicle comprising:
    a winding shaft;
    a wall arrangement having a wall section supported on said winding shaft and variable in height by operation of said winding shaft;
    a supporting frame disposed to support said wall arrangement and including a receiving device, said receiving device including a connecting piece, said connecting piece defining an outer contour which is non-rotationally symmetrical; and
    a bearing sleeve mounted on said connecting piece such that said bearing sleeve is non-rotatable relative to said connecting piece,
    wherein said winding shaft is mounted on said connecting piece such that said winding shaft forms part of said supporting frame, and said winding shaft is rotatably mounted on said connecting piece and is rotatable relative to said connecting piece and said receiving device to vary the height of said wall section.

15. The storage compartment of claim 14, wherein an end of said winding shaft is mounted on said bearing sleeve such that said winding shaft is rotatable relative to said bearing sleeve, said connecting piece and said receiving device.

16. The storage compartment of claim 15, comprising a bevel gear mounted on said end of said winding shaft for rotation therewith, said bevel gear being mounted on said bearing sleeve such that said bevel gear and said winding shaft are rotatable relative to said bearing sleeve, said connecting piece and said receiving device.

17. The storage compartment of claim 16, comprising a blocking device disposed to engage with said bevel gear to prevent rotational movement of said bevel gear and prevent variation in the height of said wall section.

18. A storage compartment for a motor vehicle comprising:
a winding shaft;
a wall arrangement having a wall section supported on said winding shaft and variable in height by operation of said winding shaft; and
a supporting frame disposed for supporting said wall arrangement and including a receiving device, said receiving device including a first connecting piece and a second connecting piece arranged at a substantially right angle relative to each other and in substantially the same plane, said receiving device being entirely disposed within said plane,
wherein said winding shaft is mounted on said first connecting piece such that said winding shaft forms a part of said supporting frame, and said winding shaft is rotatably mounted on said first connecting piece and is rotatable relative to said first connecting piece and said receiving device to vary the height of said wall section.

19. A storage compartment for a motor vehicle comprising:
a winding shaft;
a wall arrangement having a wall section supported on said winding shaft and variable in height by operation of said winding shaft;
a supporting frame disposed to support said wall arrangement and including a receiving device, said receiving device including a connecting piece; and
a bearing sleeve mounted on said connecting piece such that said bearing sleeve is non-rotatable relative to said connecting piece,
wherein said winding shaft is mounted on said connecting piece such that said winding shaft forms part of said supporting frame, said winding shaft is rotatably mounted on said connecting piece and is rotatable relative to said connecting piece and said receiving device to vary the height of said wall section, and an end of said winding shaft is mounted on said bearing sleeve such that said winding shaft is rotatable relative to said bearing sleeve.

* * * * *